United States Patent
Kuwayama

(10) Patent No.: US 8,287,172 B2
(45) Date of Patent: Oct. 16, 2012

(54) PLANAR ILLUMINATION DEVICE

(75) Inventor: Tetsuro Kuwayama, Chiba (JP)

(73) Assignee: Sony Corporation, Tokyo (JP)

( * ) Notice: Subject to any disclaimer, the term of this patent is extended or adjusted under 35 U.S.C. 154(b) by 155 days.

(21) Appl. No.: 12/848,356

(22) Filed: Aug. 2, 2010

(65) Prior Publication Data

US 2011/0038177 A1    Feb. 17, 2011

(30) Foreign Application Priority Data

Aug. 11, 2009 (JP) .................. P2009-186734

(51) Int. Cl.
 *F21V 7/04* (2006.01)
(52) U.S. Cl. ........ 362/616; 362/613; 362/615; 362/619; 385/31; 349/65
(58) Field of Classification Search .................. 362/615, 362/616, 619, 623, 620, 330, 331, 613, 626, 362/612; 385/31; 349/65
See application file for complete search history.

(56) References Cited

U.S. PATENT DOCUMENTS

| | | | |
|---|---|---|---|
| 7,371,000 B2 * | 5/2008 | Hirota et al. ................. | 362/621 |
| 7,431,481 B2 * | 10/2008 | Stefanov ...................... | 362/328 |
| 7,616,271 B2 * | 11/2009 | Souk et al. .................... | 349/65 |
| 7,658,530 B2 * | 2/2010 | Liu ............................... | 362/606 |
| 7,826,698 B1 * | 11/2010 | Meir et al. ..................... | 385/31 |
| 7,980,748 B2 * | 7/2011 | Zhang et al. ................. | 362/626 |
| 8,172,447 B2 * | 5/2012 | Meir et al. ..................... | 362/616 |
| 2008/0151142 A1 * | 6/2008 | Noba ............................ | 349/65 |

FOREIGN PATENT DOCUMENTS

JP    2007-213951    8/2007

* cited by examiner

*Primary Examiner* — John A Ward
(74) *Attorney, Agent, or Firm* — K&L Gates LLP

(57) ABSTRACT

The planar illumination device includes: a light guide plate formed by arranging a plurality of unit light guide plates each having a light emission surface as a front surface and a reflection surface as a back surface so that facing end surfaces of adjacent unit light guide plates of the plurality of unit light guide plates are closely arranged; one or two or more light sources arranged on a first side surface, in a direction where the plurality of unit light guide plates are arranged, of each of the plurality of unit light guide plates; and a recessed-and-projected structure arranged on a second side surface, facing the light sources, of each of the plurality of unit light guide plates and having an edge parallel to a normal to the light emission surface.

10 Claims, 5 Drawing Sheets

PLANAR ILLUMINATION DEVICE

CROSS REFERENCES TO RELATED APPLICATIONS

The present application claims priority to Japanese Priority Patent Application JP 2009-186734 filed in the Japan Patent Office on Aug. 11, 2009, the entire content of which is hereby incorporated by reference.

BACKGROUND

The present application relates to a planar illumination device performing large surface emission by successively arranging a plurality of unit light guide plates.

In recent years, liquid crystal display panels, advertising panels for indoor and outdoor uses, signboards and the like become larger, and accordingly, larger light guide plates as backlights of these apparatuses are necessary.

However, it is difficult to form one large light guide plate, and the cost of forming the large light guide plate is high. Therefore, a method of forming a large surface light source by successively arranging a plurality of unit light guide plates is considered. In this method, the large surface light source is manufactured more easily than a method using a large light guide plate, and cost reduction is achievable. However, in the case where a plurality of light guide plates are successively arranged to form a large surface light source, when the large surface light source emits light, a very small amount of illumination light is leaked from a connection section between the light guide plates to cause scattering in a boundary surface, thereby a bright line may be generated in the connection section.

As one technique for solving such an issue, for example, as described in Japanese Unexamined Patent Application Publication No. 2007-213951, there is proposed a technique in which thin ends which are connection parts of unit light guide plates are formed in a recessed-and-projected shape parallel to a light emission surface, and a diffusion sheet is arranged on the unit light guide plates, thereby a bright line leaked from a gap between the connection parts is dispersed.

SUMMARY

However, even if thin ends of unit light guide plates are formed in a recessed-and-projected shape parallel to a light emission surface, bright line generation in a connection part (a boundary section) between the unit light guide plates is not sufficiently inhibited, and a method of reducing bright line generation more effectively is desired.

It is desirable to provide a planar illumination device allowed to inhibit bright line generation in a boundary section between adjacent unit light guide plates by reducing a light amount reaching to the boundary section.

According to an embodiment, there is provided a planar illumination device including: a light guide plate formed by arranging a plurality of unit light guide plates each having a light emission surface as a front surface and a reflection surface as a back surface so that facing end surfaces of adjacent unit light guide plates of the plurality of unit light guide plates are closely arranged; one or two or more light sources arranged on a first side surface, in a direction where the plurality of unit light guide plates are arranged, of each of the plurality of unit light guide plates; and a recessed-and-projected structure arranged on a second side surface, facing the light sources, of each of the plurality of unit light guide plates and having an edge parallel to a normal to the light emission surface.

In the planar illumination device according to the embodiment, light emitted from the light source(s) on the first side surface of each light guide plate is reflected, toward the light source, on the second side surface facing the first side surface by the recessed-and-projected structure, and as a result, the amount of light toward a boundary surface between adjacent light guide plates is reduced.

In the planar illumination device according to the embodiment, the recessed-and-projected structure is arranged in a position facing the light source(s) in each light guide plate, so movement of light toward a boundary surface between adjacent unit light guide plates is controllable. Thereby, light leakage between the unit light guide plates is allowed to be reduced, and bright line generation is allowed to be inhibited.

Additional features and advantages are described herein, and will be apparent from the following Detailed Description and the figures.

DETAILED DESCRIPTION

The present application will be described in detail below referring to the accompanying drawings, according to an embodiment. Descriptions will be given in the following order.

First Embodiment
Modification
Second Embodiment
First Embodiment

Figure 1:
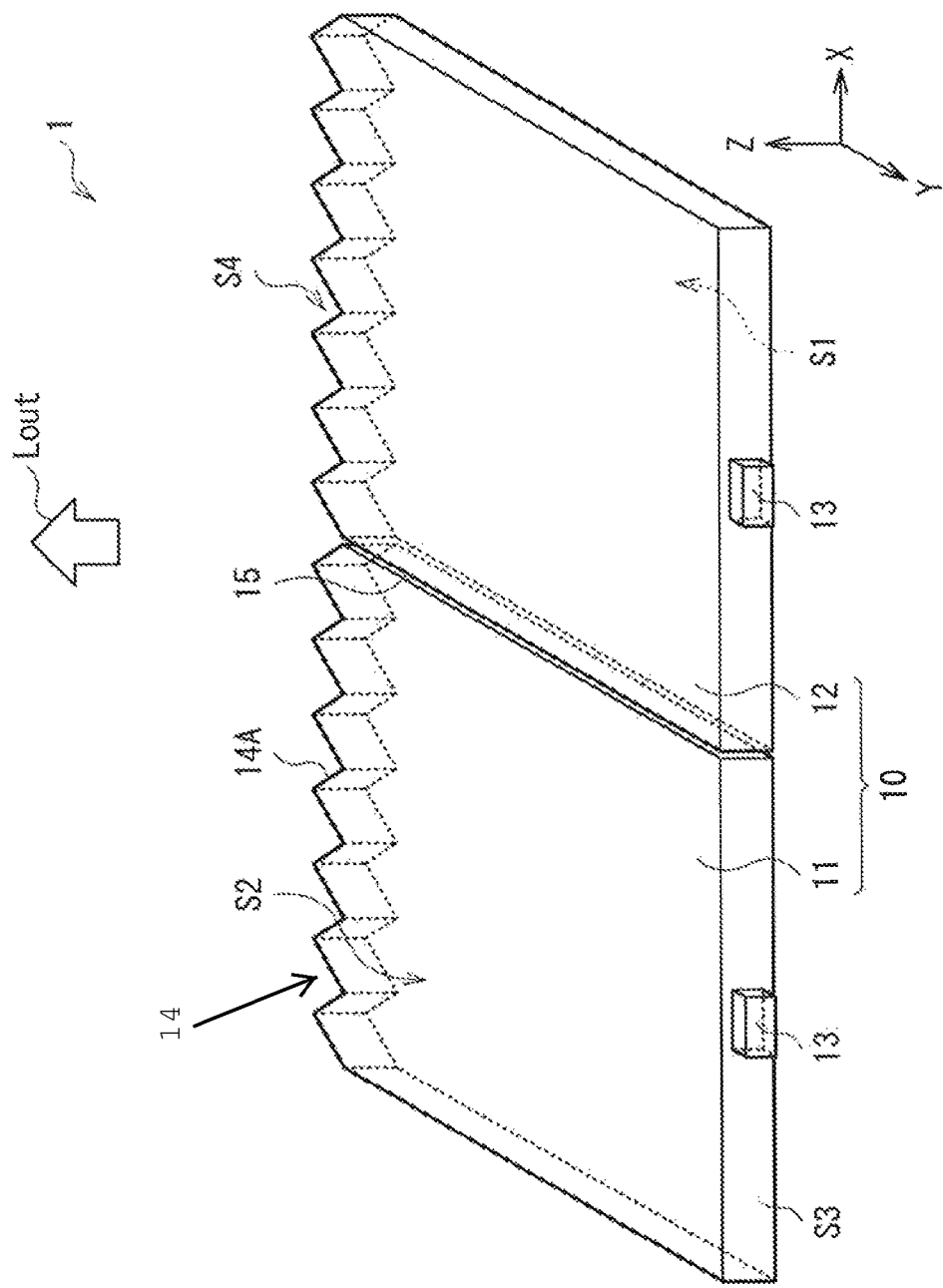
FIG. 1 is a perspective view illustrating a schematic configuration of a planar illumination device according to a first embodiment.

FIG. 1 is a perspective view illustrating a configuration of a main part of a planar illumination device 1 according to a first embodiment. The planar illumination device 1 is used as, for example, a backlight of a liquid crystal display or the like, and in the planar illumination device 1, a light guide plate 10 is formed by closely arranging a plurality of unit light guide plates in one or two or more lines. Here, the light guide plate 10 configured of two unit light guide plates 11 and 12 will be described below.

In the planar illumination device 1, a light source 13 is arranged on a side surface S3 (a first side surface), along a direction (an x direction) where the unit light guide plates 11 and 12 are arranged, of each of the unit light guide plates 11 and 12. The unit light guide plates 11 and 12 each have, for example, a rectangular flat shape, and a back surface of each of the unit light guide plates 11 and 12 is a reflection surface S1, and a front surface of each of the unit light guide plates 11 and 12 is a light emission surface S2 emitting emission light Lout.

The unit light guide plates 11 and 12 each propagate and guide light from each light source 13 to the light emission surface S2. The unit light guide plates 11 and 12 are formed of, for example, a glass material, but the unit light guide plates 11 and 12 may be formed of any other material which is allowed to propagate light from the light source 13. In other words, the material of the unit light guide plates 11 and 12 is not limited to a material with high transparency, and the unit light guide plates 11 and 12 may be formed of a light-scattering material or a light-diffusing material in which light-scattering particles are dispersed. Any material including such light-scattering particles may be used, as long as desired optical characteristics are obtained in the light emission surface. These materials include an acrylic resin, polymethyl methacrylate (PMMA), polycarbonate (PC), cyclic polyolefin (COP) and the like. The shapes, sizes, refractive indexes, concentrations, concentration distributions and the like of the unit light guide plates 11 and 12 are arbitrarily adjustable so as to obtain desired characteristics.

As the light source 13, for example, a point light source such as a LED (Light Emitting Diode) or a line light source such as a fluorescent lamp is used. The number of light sources 13 for each of the unit light guide plates 11 and 12 may be adjusted depending on, for example, the length of the side surface of each of the unit light guide plates 11 and 12, and is not specifically limited.

A side surface S4 (a second side surface), facing the light source 13, of each of the unit light guide plates 11 and 12 has a recessed-and-projected structure 14. The recessed-and-projected structure 14 is configured of one or more prisms 14A having an edge parallel to a normal to the light emission surface S2. In the embodiment, the reflection direction of light reaching the side surface S4 from the light source 13 is controlled by the prism 14A so as to reduce the amount of light reaching a boundary section between the unit light guide plates 11 and 12.

Figure 2:
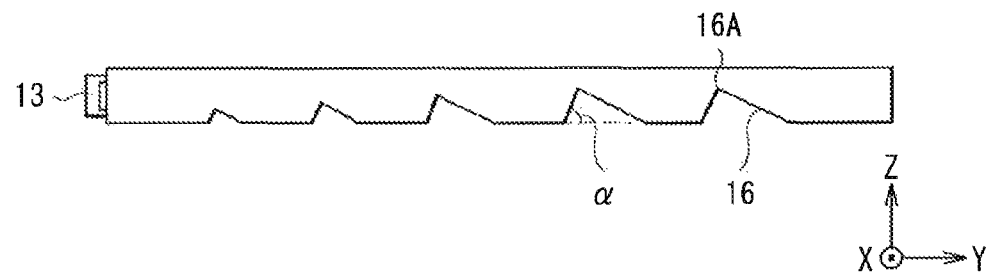
FIG. 2 is a side view illustrating a configuration of a reflection surface of a light guide plate.

As illustrated in FIG. 2, a light guide control section 16 is arranged on the reflection surface S1 of each of the unit light guide plates 11 and 12. The light guide control section 16 controls the guide of light entering from the light source 13 to each of the unit light guide plates 11 and 12. The light guide control section 16 has an inclined surface (an inclined angle α) inclined with respect to the light source 13, and includes a plurality of projection sections 16A extending in the X direction. The inclined angle is an angle which an inclined surface facing the light source 13 forms with a bottom surface. The projection sections 16A of the light guide control section 16 may be arranged at regular intervals or different intervals. The inclined angles α of the plurality of projection sections 16A are the same as one another. For example, the projection sections 16A are arranged so that the heights H (distances from the bottom surface to the top of a projected structure) of the projection sections 16A gradually increase with distance from the light source 13.

When such a light guide control section 16 is arranged, a uniform light emission strength distribution as a whole light guide plate is allowed to be formed.

Figure 3:
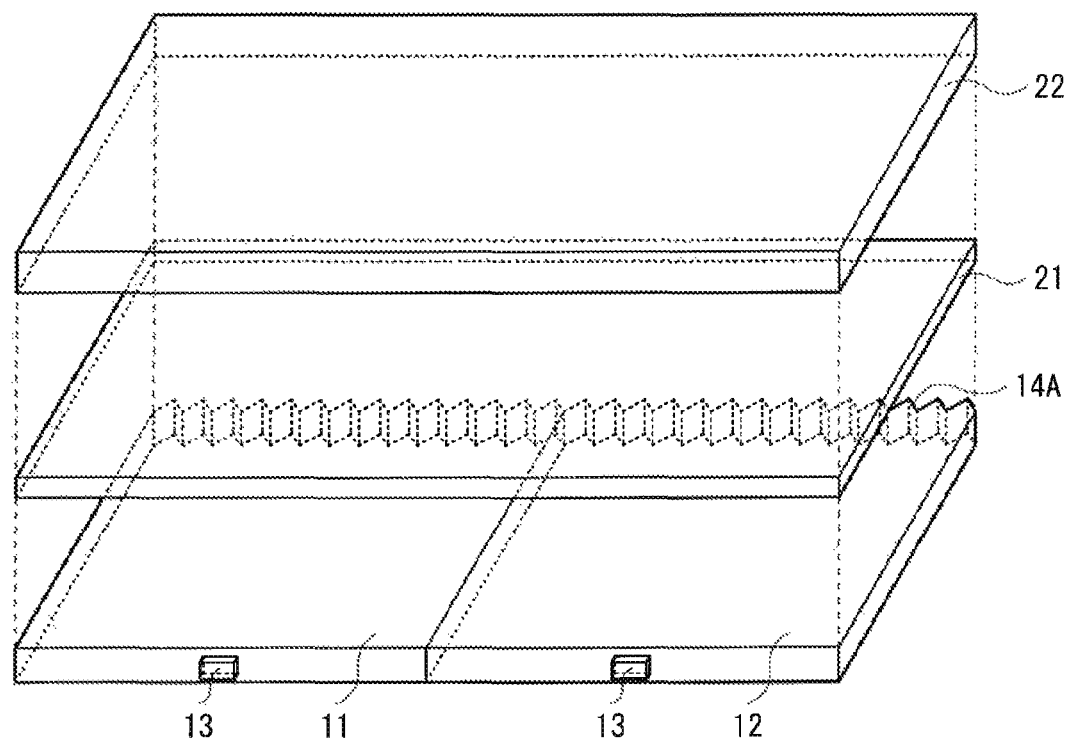
FIG. 3 is a perspective view illustrating a schematic configuration of a liquid crystal display including the planar illumination device according to the first embodiment.

FIG. 3 illustrates a schematic configuration of a liquid crystal display including the planar illumination device 1, and the liquid crystal display includes a diffusion sheet 21 and a liquid crystal panel 22 on the light guide plate 10 configured of the above-described unit light guide plates 11 and 12.

In the planar illumination device 1 according to the embodiment, when each light source 13 emits light, light enters into each of the unit light guide plates 11 and 12. The light entering into each of the unit light guide plates 11 and 12 is reflected by the reflection surface S1 having the light guide control section 16 to propagate through each of the unit light guide plates 11 and 12, and then the light is emitted from the light emission surface S2 of each of the unit light guide plates 11 and 12, thereby surface emission is performed in the planar illumination device 1. The light emitted from the light emission surface S2 enters into the liquid crystal panel 22 through the diffusion sheet 21

In this case, when the side surface S4 facing the light source 13 has a flat shape, as described above, light reaching the side surface S4 is reflected to cause light leakage from a boundary section 15 between the unit light guide plates 11 and 12.

Figure 4:
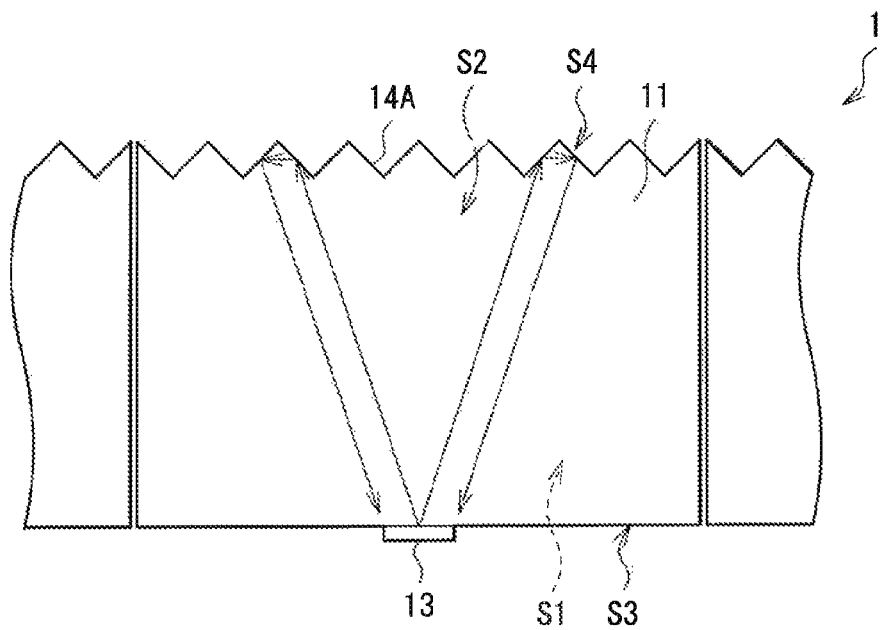
FIG. 4 is a plan view illustrating a light guide plate in related art.

On the other hand, in the embodiment, the recessed-and-projected structure 14 configured of the prism 14A is arranged on a surface (the side surface S4), facing the light source 13, of each of the unit light guide plates 11 and 12, so as illustrated in FIG. 4, the reflection angle of light reaching the side surface S4 is controlled, and most of the light is reflected toward the light source 13. As a result, light toward the boundary section 15 between the unit light guide plates 11 and 12 is reduced.

Figure 5:
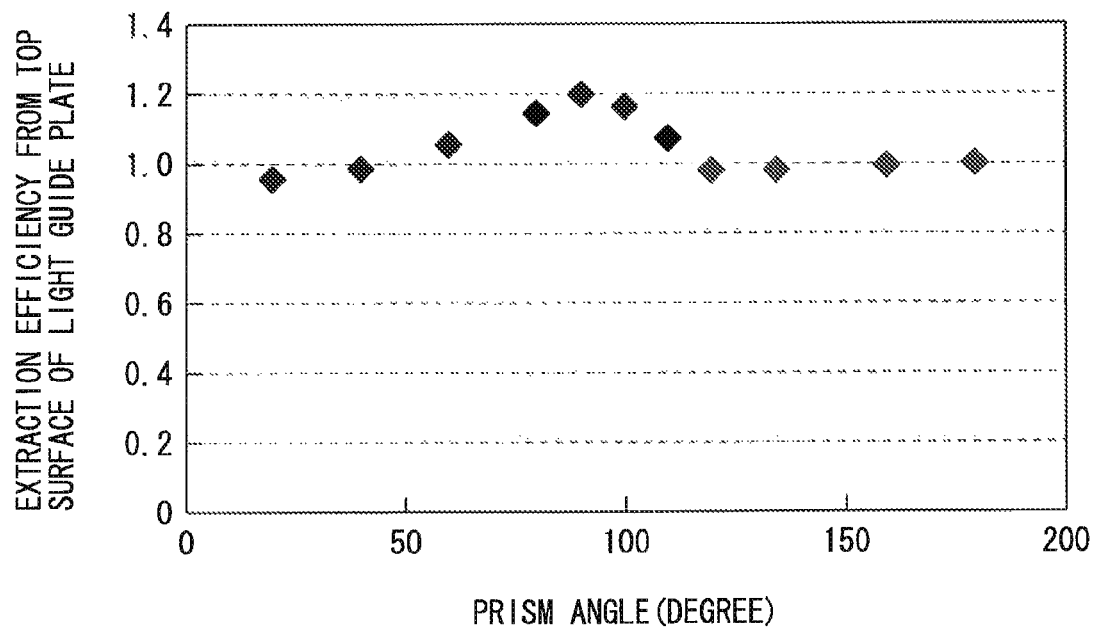
FIG. 5 is a plot illustrating an effect depending on an apex angle of a prism.

FIG. 5 illustrates efficiency of light which is not reflected toward the boundary section 15 and is extracted from the light emission surface S2 of each of the unit light guide plates 11 and 12 depending on an apex angle of the prism 14A. Extraction efficiency is 1 in the case where the apex angle of the prism 14A is 180° (flat). It is obvious from FIG. 5 that an effective apex angle of the prism 14A is within a range of 60° to 110°, and an apex angle of 90° is most preferable. A surface of the prism 14A may be coated with a dielectric material or a metal material, or a reflection film may be formed on the surface of the prism 14A so as to further enhance reflectivity.

As described above, in the embodiment, the recessed-and-projected structure 14 (the prism 14A) is arranged on the side surface S4, facing the side surface S3 on which the light source 13 is arranged, of each of the unit light guide plates 11 and 12, so the reflection angle of light reaching the side surface S4 is controllable. Therefore, light leakage in the boundary section 15 between the unit light guide plates 11 and 12 is allowed to be reduced, thereby bright light generation is allowed to be inhibited.

Moreover, light entering from the light source 13 to each of the unit light guide plates 11 and 12 and reaching the side surface S4 without being emitted from the light emission surface S2 is reflected by the prism 14A to be returned to each of the light guide plates 11 and 12. More chances of the returned light being emitted from the light emission surface S2 again is provided, so light use efficiency is improved, and light extraction efficiency in the unit light guide plates 11 and 12 is improved.

Modification

Figure 6:
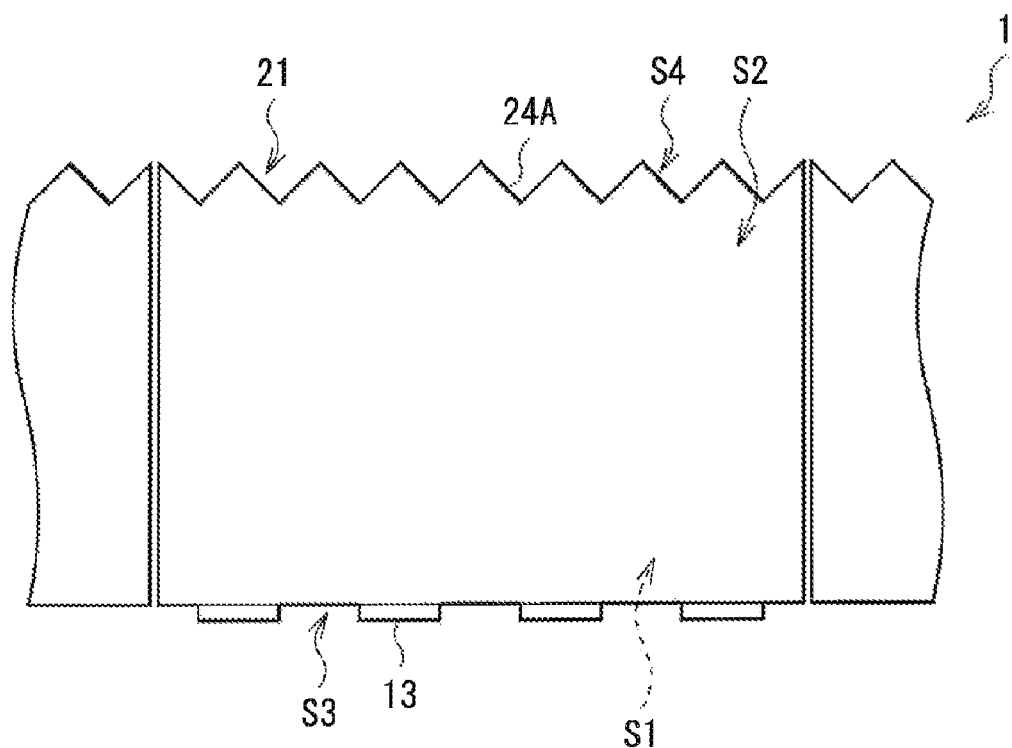
FIG. 6 is a plan view of a light guide plate according to a modification.

In the above-described embodiment, one light source 13 is arranged for each of the unit light guide plates 11 and 12, but any number of the light sources 13 may be arranged. For example, as illustrated in FIG. 6, four light sources 13 may be arranged for each unit light guide plate 21. Necessary light emission strength is obtainable by adjusting the number of the light sources 13.

Second Embodiment

Figure 7:
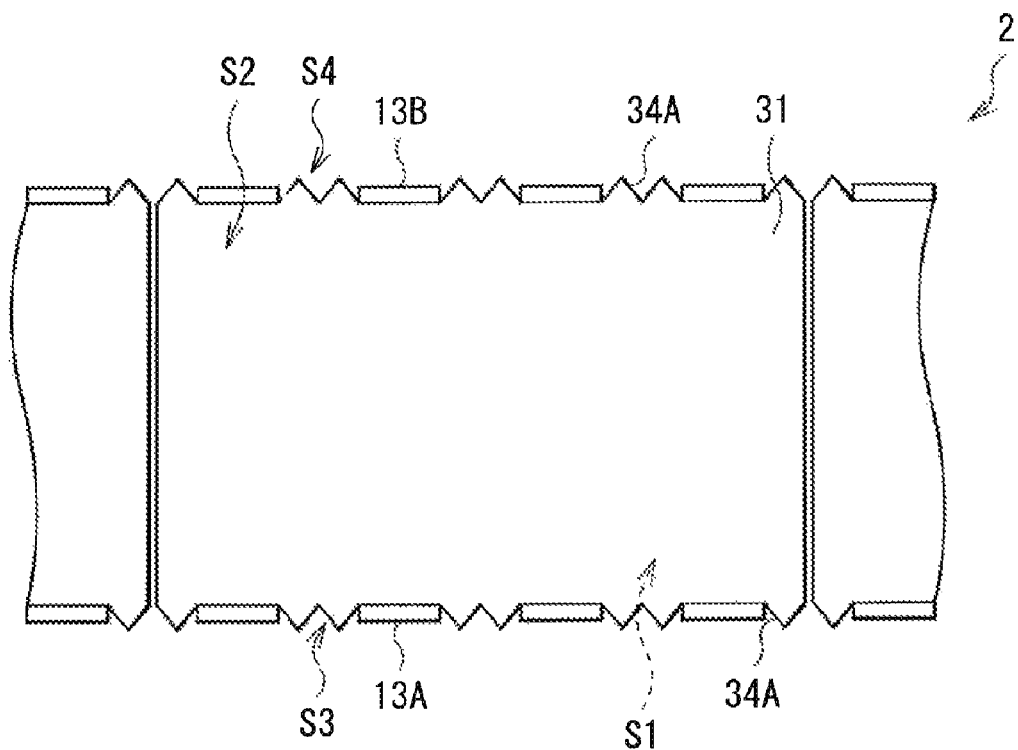
FIG. 7 is a plan view of a light guide plate according to a second embodiment.

FIG. 7 illustrates a planar configuration of a planar illumination device 2 according to a second embodiment. In the embodiment, light sources 13A and 13B are arranged on side surfaces S3 and S4, respectively, in a direction where the unit light guide plates 11 and 12 are arranged, and the recessed-and-projected structure 14 (the prism 14A) is also arranged on each of the side surfaces S3 and S4.

Figure 8:
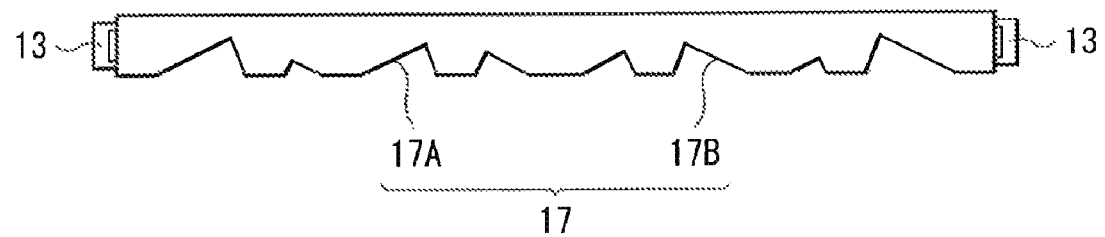
FIG. 8 is a side view illustrating a configuration of a reflection surface of the light guide plate.

In the embodiment, as illustrated in FIG. 8, projection sections 17A and 17B of two kinds are alternately arranged as a light guide control section 17 on the reflection surface 51 of each of the unit light guide plates 11 and 12. However, the projection sections 17A and 17B are not necessarily arranged alternately. The inclined angle of the projection section 17A facing the light source 13A and the inclined angle of the projection section 17B facing the light source 13B are the same as each other, and the projection sections 17A and 17B are line-symmetric.

In the embodiment, the light sources 13A and 13B are arranged on the side surfaces S3 and S4, respectively, so light emission strength is allowed to be enhanced, and light control as in the case of the first embodiment is allowed to be performed.

Although the present application is described referring to the embodiments and the modification, the application is not limited thereto, and may be variously modified. For example, the shape of the recessed-and-projected structure in the side surface S4 facing the light source 13 is not limited to the shape of the above-described prism 14A, and the recessed-and-projected structure may have a spherical shape, a trapezoidal shape or the like, as long as the recessed-and-projected structure has a shape which reflects light reaching the side surface S4 to the side surface S3. Moreover, light from the light source is not limited to visible light, and may be nonvisible light such as infrared light or ultraviolet light, and may be changed depending on intended use.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A planar illumination device comprising:
a light guide plate formed by arranging a plurality of unit light guide plates, each unit light guide plate including
a light emission surface as a front surface,
a reflection surface as a back surface so that facing end surfaces of adjacent unit light guide plates of the plurality of unit light guide plates are closely arranged,
at least one light source arranged on each of a first side surface and a second side surface that is positioned opposite to the first side surface, in a direction where the plurality of unit light guide plates are arranged, and
a recessed-and-projected structure arranged on each of the first side surface and the second side surface, facing the oppositely positioned light sources, and having an edge parallel to a normal to the light emission surface,
wherein the light sources and the recessed-and-projected structures are alternately arranged on each of the first side surface and the second side surface.

2. The planar illumination device according to claim 1, wherein the recessed-and-projected structure has a prism shape.

3. The planar illumination device according to claim 2, wherein an apex angle of the prism shape is within a range of 60° to 110°.

4. The planar illumination device according to claim 1, wherein on the first side surface and the second side surface the light sources are positioned in regions where the recessed-and-projected structure is not formed.

5. The planar illumination device according to claim 4, wherein a plurality of light sources are formed on each of the first side surface and the second side surface.

6. The planar illumination device according to claim 1, wherein a light guide control section is formed on the reflection surface of each unit light guide plate.

7. The planar illumination device according to claim 6, wherein each light guide control section includes a plurality of first projection sections each having an inclined surface relative to a plane of the reflection surface, the inclined surfaces of the first projection sections being configured to reflect light from at least one light source on the first side surface.

8. The planar illumination device according to claim 7, wherein the first projection sections are arranged such that the heights of the first projection sections increase in a direction away from the at least one light source on the first side surface.

9. The planar illumination device according to claim 8, wherein each light guide control section includes a plurality of second projection sections each having an inclined surface relative to a plane of the reflection surface, the inclined surfaces of the second projection sections being configured to reflect light from at least one light source on the second side surface, the second projection sections being alternately arranged with the first projection sections.

10. The planar illumination device according to claim 9, wherein the second projection sections are arranged such that the heights of the second projection sections increase in a direction away from the at least one light source on the second side surface.

* * * * *